US012699336B2

(12) United States Patent
Furuta

(10) Patent No.: US 12,699,336 B2
(45) Date of Patent: Aug. 4, 2026

(54) IMAGE FORMING APPARATUS

(71) Applicant: CANON KABUSHIKI KAISHA, Tokyo (JP)

(72) Inventor: Yasutomo Furuta, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/770,805

(22) Filed: Jul. 12, 2024

(65) Prior Publication Data

US 2024/0361711 A1 Oct. 31, 2024

Related U.S. Application Data

(63) Continuation of application No. 18/210,849, filed on Jun. 16, 2023, now Pat. No. 12,078,939, which is a (Continued)

(30) Foreign Application Priority Data

Dec. 18, 2020 (JP) ................................ 2020-210271

(51) Int. Cl.
*G03G 15/043* (2006.01)

(52) U.S. Cl.
CPC ... *G03G 15/043* (2013.01); *G03G 2215/0407* (2013.01)

(58) Field of Classification Search
CPC ......... G03G 15/043; G03G 2215/0407; G03G 15/04036; G03G 15/04063; G03G 2215/0456
See application file for complete search history.

(56) References Cited

U.S. PATENT DOCUMENTS 5,612,728 A 3/1997 Kun et al.
8,059,308 B2 11/2011 Silverbrook
(Continued)

FOREIGN PATENT DOCUMENTS

CN 1761937 A 4/2006
CN 110618591 A 12/2019
(Continued)

OTHER PUBLICATIONS

International Search Report dated Sep. 14, 2021, in International Application No. PCT/JP2021/029532.
(Continued)

*Primary Examiner* — Sandra Brase
(74) *Attorney, Agent, or Firm* — Venable LLP

(57) ABSTRACT

An image forming apparatus includes: an exposure head including a light emitting portion that includes a first electrode layer including a plurality of electrodes that are two-dimensionally arranged in a main scanning direction and a sub-scanning direction, a light emitting layer stacked on the first electrode layer, and a second electrode layer through which light is transmissible; and a controller configured to control a voltage applied to each of the plurality of electrodes in such a way that the light emitting layer emits light, in which the plurality of electrodes for forming an identical pixel are arranged in such a way that the electrodes partially overlap each other when viewed from the rotation direction, and an inter-centroid distance of the plurality of electrodes in the rotational axis direction is equal in the rotational axis direction, and d3=W1/n (n is a natural number of 2 or more), in which W1 [mm] is a width of the electrode in the rotational axis direction, n is the number of electrodes for forming the identical pixel, and d3 [mm] is the equal inter-centroid distance in the rotational axis direction.

8 Claims, 18 Drawing Sheets

Related U.S. Application Data continuation of application No. PCT/JP2021/029532, filed on Aug. 10, 2021.

(56) References Cited

U.S. PATENT DOCUMENTS

| | | | |
|---|---|---|---|
| 9,358,807 | B2 | 6/2016 | Yano et al. |
| 10,114,310 | B2 | 10/2018 | Matsuo et al. |
| 10,852,657 | B2 | 12/2020 | Furuta |
| 11,635,703 | B2 | 4/2023 | Furuta et al. |
| 2009/0060545 | A1 | 3/2009 | Matsuoka et al. |
| 2010/0080594 | A1 | 4/2010 | Sowa et al. |
| 2015/0239258 | A1 | 8/2015 | Yano et al. |
| 2019/0384205 | A1* | 12/2019 | Furuta .................. G03G 15/043 |
| 2020/0150554 | A1 | 5/2020 | Furuta |
| 2020/0285919 | A1 | 9/2020 | Tanimoto |
| 2021/0294240 | A1* | 9/2021 | Watanabe ........ G03G 15/04063 |

FOREIGN PATENT DOCUMENTS

| | | | |
|---|---|---|---|
| JP | 2002-292922 | A | 10/2002 |
| JP | 2007-190786 | A | 8/2007 |
| JP | 2008-165195 | A | 7/2008 |
| JP | 2009-151975 | A | 7/2009 |
| JP | 2012-176506 | A | 9/2012 |
| JP | 2015-157391 | A | 9/2015 |
| JP | 2015-199207 | A | 11/2015 |
| JP | 2016-016668 | A | 2/2016 |
| JP | 2017-081102 | A | 5/2017 |
| JP | 2018-134820 | A | 8/2018 |
| JP | 2019-217653 | A | 12/2019 |
| WO | 2021-039354 | A1 | 3/2021 |

OTHER PUBLICATIONS

Extended European Search Report dated Dec. 6, 2024, in European Patent Application No. 21906051.4.

Office Action dated Jun. 18, 2025 in Chinese Patent Application No. 202180083735.3.

Office Action dated Oct. 21, 2025, in Japanese Patent Application No. 2024-202008.

* cited by examiner

IMAGE FORMING APPARATUS

CROSS-REFERENCE TO RELATED APPLICATIONS

This application is a Continuation of International Patent Application No. PCT/JP2021/029532, filed Aug. 10, 2021, which claims the benefit of Japanese Patent Application No. 2020-210271, filed Dec. 18, 2020, both of which are hereby incorporated by reference herein in their entirety.

BACKGROUND OF THE INVENTION

Field of the Invention

The present invention relates to an image forming apparatus such as an electrophotographic copying machine or an electrophotographic printer that forms an image on a sheet by using an electrophotographic image forming system.

Description of the Related Art

In a case where an image is formed by an image forming apparatus of an electrophotographic system, first, an electrostatic latent image is formed on the surface of a photosensitive member by irradiating the surface of the photosensitive member with light according to image data. Thereafter, toner is attached to the electrostatic latent image on the surface of the photosensitive member by a development device to form a toner image, the toner image is transferred to a sheet, and the toner image transferred to the sheet is heated by a fixing device and fixed to the sheet to form an image.

Here, Japanese Patent Laid-Open No. 2018-134820 discloses an image forming apparatus which is an apparatus that forms an electrostatic latent image by irradiating a photosensitive member with light, the image forming apparatus including an exposure head that includes a light emitting portion using an organic EL and a lens that forms an image of light emitted from the light emitting portion on the surface of the photosensitive member. By using the exposure head in this manner, it is possible to reduce the number of components as compared with a configuration of a laser scanning system in which deflection scanning of laser light is performed using a rotating polygon mirror to form an electrostatic latent image, and it is possible to reduce the size and manufacturing cost of the image forming apparatus.

In addition, it cannot be said that a light quantity of one light emitting portion using the organic EL in the exposure head is sufficiently high. Therefore, Japanese Patent Laid-Open No. 2018-134820 describes a configuration in which a plurality of light emitting portions irradiate the same portion of the surface of the photosensitive member with light in order to supplement the light quantity for forming an electrostatic latent image on the surface of the photosensitive member. Specifically, in the exposure head, the light emitting portions are two-dimensionally arranged in a rotational axis direction (main scanning direction) and a rotation direction (sub-scanning direction) of the photosensitive member. Then, the light emitting portions adjacent to each other in the rotation direction of the photosensitive member are caused to emit light at different timings according to a rotation speed of the photosensitive member, so that the plurality of light emitting portions irradiate the same portion of the surface of the photosensitive member with light. Hereinafter, irradiating the same portion of the surface of the photosensitive member with light by the plurality of light emitting portions in this manner is referred to as multiple exposure.

Further, in the exposure head, in a case where a mounting position of the light emitting portion is shifted when the light emitting portion is mounted on a substrate, there is a possibility that an exposure position on the photosensitive member is shifted and a positional shift of the image occurs. On the other hand, Japanese Patent Laid-Open No. 2019-217653 describes a configuration in which dithering processing is executed on image data having a resolution higher than an interval between the light emitting portions in the main scanning direction, the image data is shifted according to a shift amount of the mounting position of the light emitting portion, and then the image data is converted according to a pitch of the light emitting portions in the main scanning direction. As a result, the positional shift of the image can be corrected with a resolution higher than the pitch of the light emitting portions in the main scanning direction.

However, in the configuration of Japanese Patent Laid-Open No. 2019-217653, the positional shift of the image can be corrected with a resolution higher than the interval between the light emitting portions in the main scanning direction, but the sharpness of the image may decrease. This will be described below with reference to the drawings.

FIG. 18A is a view illustrating an example of image data when the dithering processing is executed on image data having a resolution higher than a pitch of the light emitting portions in the main scanning direction and the image data is shifted according to a shift amount of the mounting positions of the light emitting portions. FIG. 18B is a view when the image data illustrated in FIG. 18A is converted according to the pitch of the light emitting portions in the main scanning direction. As illustrated in FIG. 18, in the configuration of Japanese Patent Laid-Open No. 2019-217653, when the high-resolution image data is converted according to the pitch of the light emitting portions in the main scanning direction, data of an edge portion of the image becomes an intermediate value, and the sharpness of the image may decrease.

SUMMARY OF THE INVENTION

An object of the present invention is to provide an image forming apparatus capable of correcting an image position with a resolution higher than a pitch of a light emitting portions in a main scanning direction while securing a light quantity by multiple exposure in an exposure head and suppressing a decrease in sharpness of an image.

A representative configuration of the present invention is an image forming apparatus configured to expose a surface of a photosensitive member with light to form an electrostatic latent image, and attach toner to the electrostatic latent image to form an image, the image forming apparatus including: an exposure head configured to expose the surface of the photosensitive member with light to form the electrostatic latent image and including a light emitting portion that includes a substrate, a first electrode layer including a plurality of electrodes that are two-dimensionally arranged in a rotation direction of the photosensitive member and a rotational axis direction of the photosensitive member and are arranged on the substrate at intervals, a light emitting layer stacked on the first electrode layer and configured to emit light when a voltage is applied, and a second electrode layer arranged on a side opposite to a side where the first electrode layer is arranged with respect to the light emitting layer and through which light is transmissible; and a controller configured to control application of a voltage to each of the plurality of electrodes included in the first electrode layer based on image data in such a way that the light emitting layer emits light and configured to control the voltage applied to each of the plurality of electrodes based on the image data in such a way that one pixel is formed by controlling the voltage applied to the plurality of electrodes arranged at different positions in the rotation direction, in which the plurality of electrodes for forming an identical pixel are arranged in such a way that the electrodes partially overlap each other when viewed from the rotation direction, and an inter-centroid distance of the plurality of electrodes in the rotational axis direction is equal in the rotational axis direction, d3=W1/n (n is a natural number of 2 or more), in which W1 [mm] is a width of the electrode in the rotational axis direction, n is the number of electrodes for forming the identical pixel, and d3 [mm] is the equal inter-centroid distance in the rotational axis direction, and the plurality of electrodes for forming the identical pixel are arranged in such a way that centroid positions of the respective electrodes are positioned at the interval of d3 in the rotational axis direction.

Further features of the present invention will become apparent from the following description of embodiments with reference to the accompanying drawings.

DESCRIPTION OF THE EMBODIMENTS

<Image Forming Apparatus>

Hereinafter, an overall configuration of an image forming apparatus A according to the present invention will be described together with an operation at the time of image formation with reference to the drawings. Note that the dimensions, materials, shapes, relative arrangements, and the like of components described below are not intended to limit the scope of the present invention unless otherwise specified.

The image forming apparatus A according to the present embodiment is a full-color image forming apparatus in which four color toners of yellow Y, magenta M, cyan C, and black K are transferred to a sheet to form an image. In the following description, although members using the toners of the respective colors are given suffixes of Y, M, C, and K, configurations or operations of the respective members are substantially the same as each other except that the color of the toner used is different, and thus the suffixes are omitted as appropriate unless necessary to distinguish the members from each other.

Figure 1:
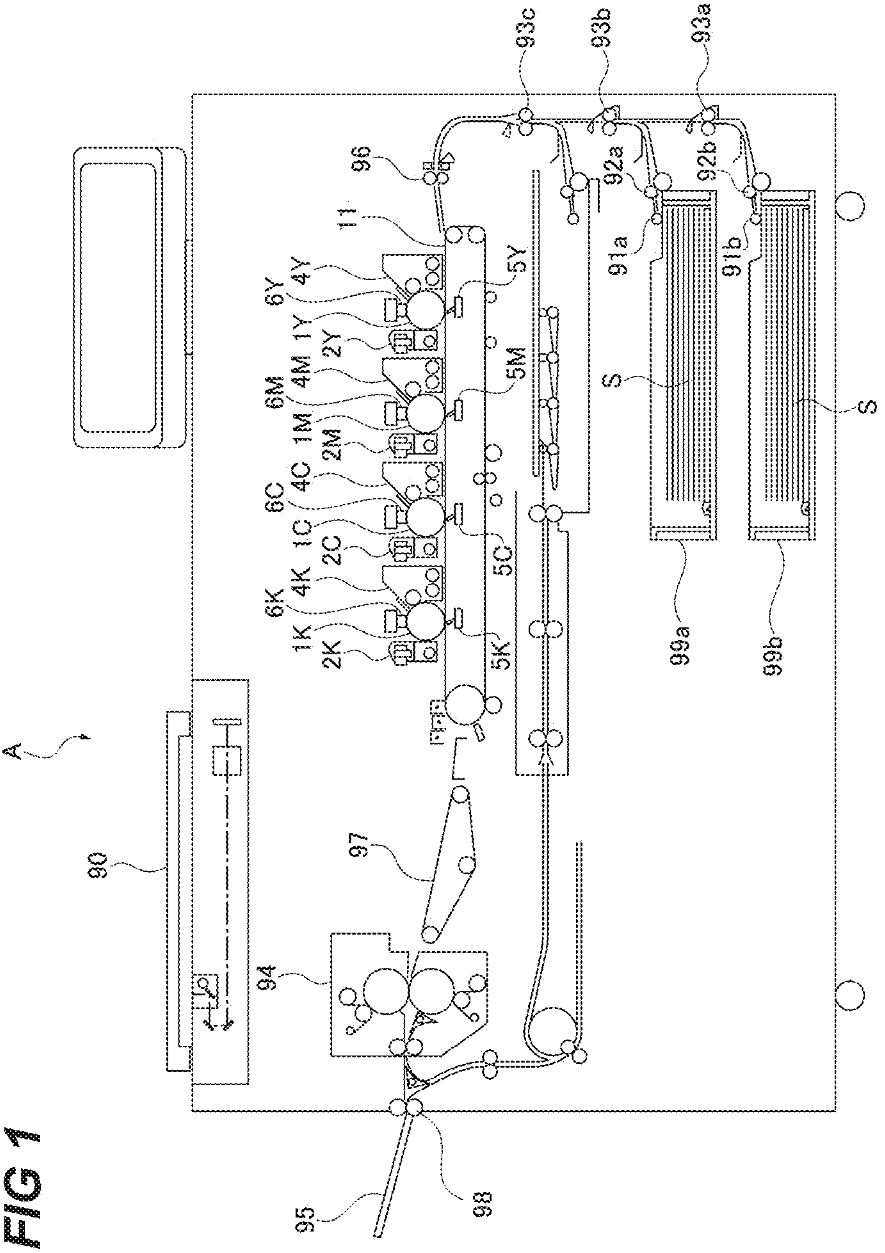
FIG. 1 is a schematic cross-sectional view of an image forming apparatus.

FIG. 1 is a schematic cross-sectional view of the image forming apparatus A. As illustrated in FIG. 1, the image forming apparatus A includes an image forming portion that forms an image. The image forming portion includes photosensitive drums 1 (1Y, 1M, 1C, and 1K) serving as photosensitive members, charging devices 2 (2Y, 2M, 2C, and 2K), exposure heads 6 (6Y, 6M, 6C, and 6K), development devices 4 (4Y, 4M, 4C, and 4K), and transfer devices 5 (5Y, 5M, 5C, and 5K).

Next, an image forming operation performed by the image forming apparatus A will be described. In a case of forming an image, first, a sheet S accommodated in a sheet cassette 99*a* or a sheet cassette 99*b* is conveyed to a registration roller 96 by a pickup roller 91*a* or 91*b*, a feeding roller 92*a* or 92*b*, and conveying rollers 93*a* to 93*c*. Thereafter, the sheet S is fed to a conveying belt 11 at a predetermined timing by the registration roller 96.

Meanwhile, in the image forming portion, first, a surface of the photosensitive drum 1Y is charged by the charging device 2Y. Next, the exposure head 6Y irradiates the surface of the photosensitive drum 10Y with light according to image data read by an image reading portion 90 or image data transmitted from an external device (not illustrated), and forms an electrostatic latent image on the surface of the photosensitive drum 10Y Thereafter, yellow toner is attached to the electrostatic latent image formed on the surface of the photosensitive drum 1Y by the development device 4Y to form a yellow toner image on the surface of the photosensitive drum 1Y. As a transfer bias is applied to the transfer device 5Y, the toner image formed on the surface of the photosensitive drum 1Y is transferred to the sheet S that is being conveyed by the conveying belt 11.

By a similar process, the photosensitive drums 1M, 1C, and 1K are also irradiated with light by the exposure heads 6M, 6C, and 6K to form electrostatic latent images, and toner images of magenta, cyan, and black are formed by the development devices 4M, 4C, and 4K. Further, as a transfer bias is applied to the transfer devices 5M, 5C, and 5K, these toner images are overlappingly transferred onto the yellow toner image on the sheet S. As a result, a full-color toner image corresponding to the image data is formed on a surface of the sheet S.

Thereafter, the sheet S carrying the toner image is conveyed to a fixing device 94 by a conveying belt 97, and subjected to heating and pressurization processing in the fixing device 94. As a result, the toner image on the sheet S is fixed to the sheet S. Then, the sheet S to which the toner image is fixed is discharged to a discharge tray 95 by a discharge roller 98.

<Exposure Head>

Next, a configuration of the exposure head 6 will be described.

Figure 2A:
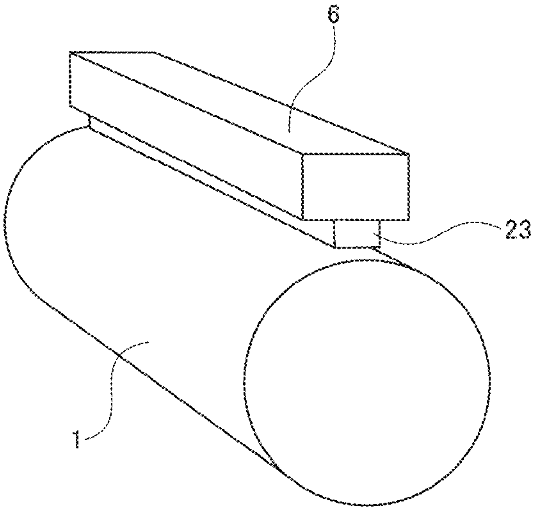
FIGS. 2A and 2B are a perspective view and a cross-sectional view of a photosensitive drum and an exposure head.
Figure 2B:
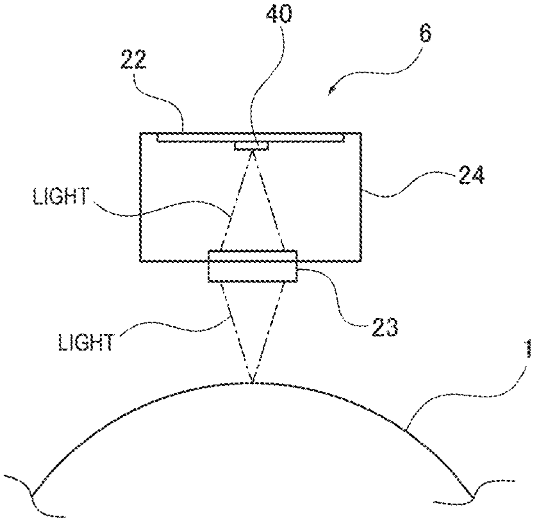
Figure 3A:
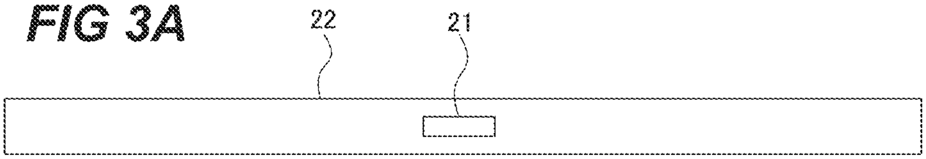
FIGS. 3A to 3C are views illustrating a mounting surface of a printed circuit board included in the exposure head.
Figure 3B:
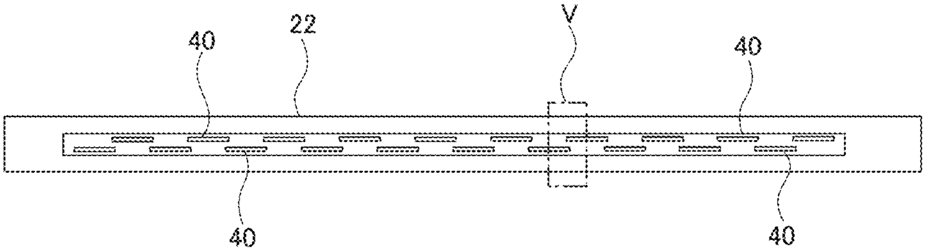
Figure 3C:
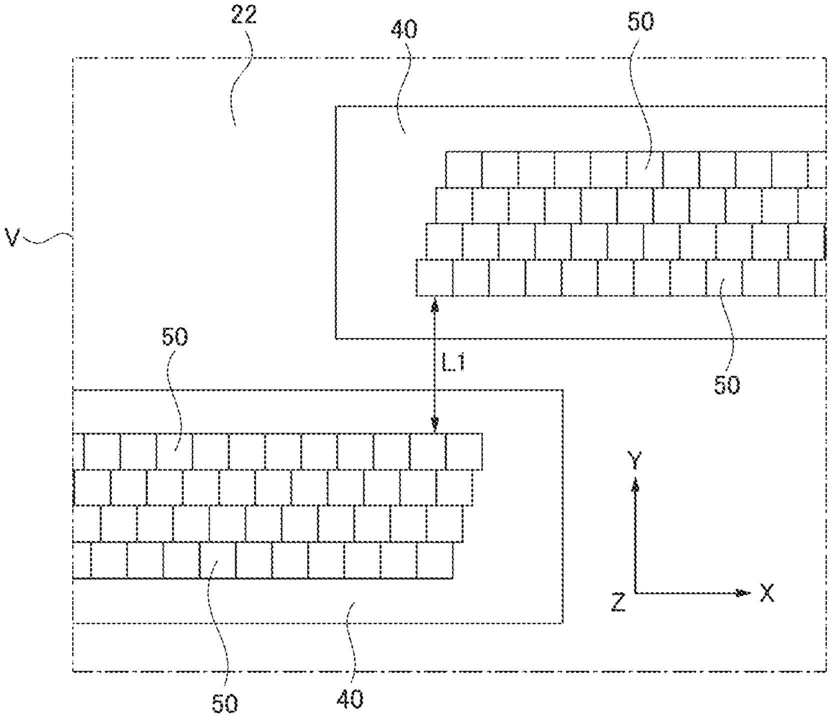

FIG. 2A is a perspective view of the photosensitive drum 1 and the exposure head 6. FIG. 2B is a cross-sectional view of the photosensitive drum 1 and the exposure head 6. FIGS. 3A and 3B are views illustrating mounting surfaces on one side and the other side of a printed circuit board 22 included in the exposure head 6. FIG. 3C is an enlarged view of a region V illustrated in FIG. 3B.

As illustrated in FIG. 2, the exposure head 6 is fixed at a position facing the surface of the photosensitive drum 1 by a fixing member (not illustrated). The exposure head 6 includes a light emitting element array chip 40 that emits light and the printed circuit board 22 on which the light emitting element array chip 40 is mounted. In addition, there are provided a rod lens array 23 that forms an image of (collects) light emitted from the light emitting element array chip 40 on the photosensitive drum 1, and a housing 24 to which the rod lens array 23 and the printed circuit board 22 are fixed.

A connector 21 is mounted on a surface of the printed circuit board 22 that is opposite to a surface on which the light emitting element array chip 40 is mounted. The connector 21 is provided to transmit a control signal for the light emitting element array chip 40 transmitted from an image controller portion 70 (FIG. 8) and to connect a power line. The light emitting element array chip 40 is driven via the connector 21.

As illustrated in FIG. 3, 20 light emitting element array chips 40 are mounted in a staggered manner in two rows on the printed circuit board 22. In each light emitting element array chip 40, 748 light emitting portions 50 are arranged at a predetermined resolution pitch in a longitudinal direction (arrow X direction). In each light emitting element array chip 40, four light emitting portions 50 are arranged at a predetermined pitch in a lateral direction (arrow Y direction). That is, in each light emitting element array chip 40, the light emitting portions 50 are two-dimensionally arranged in the arrow X direction and the arrow Y direction. The four light emitting portions 50 arranged in the arrow Y direction form an identical pixel by multiple exposure described below.

In the present embodiment, the resolution pitch of the light emitting element array chip 40 is 1200 dpi (about 21.16 μm). In addition, a distance from one end portion to the other end portion of the light emitting portions 50 included in each light emitting element array chip 40 in the longitudinal direction is about 15.828 mm. That is, the exposure head 6 includes a total of 14960 light emitting portions 50 in the arrow X direction, which enables exposure processing corresponding to an image width of about 316 mm (≈about 15.8 mm×20 chips) in the longitudinal direction. In addition, in the lateral direction (arrow Y direction) of the light emitting element array chip 40, an interval L1 between the light emitting portions 50 of the adjacent light emitting element array chips 40 is about 105 μm (five pixels at 1200 dpi and ten pixels at 2400 dpi).

In addition, the light emitting element array chips 40 adjacent to each other in the arrow Y direction are arranged in such a way that the light emitting portions 50 of the respective light emitting element array chips overlap each other in the arrow X direction. The reason for this is to suppress the positional shift in a mounting process for the light emitting element array chip 40, and to prevent an image streak from being formed by shading due to the positional shift of light with which the photosensitive drum 1 is irradiated at a boundary portion between the light emitting element array chips 40. An overlapping amount is calculated from the maximum amount of mounting variation of a mounting device (die bonder), and is set to an amount in which no gap is formed between the light emitting portions 50 included in the respective light emitting element array chips 40 adjacent in the arrow Y direction.

Further, in a head information storage portion 171 (FIG. 8) of the exposure head 6, a positional shift amount at the time of mounting the light emitting element array chip 40 is measured and stored in a manufacturing process. At the time of image formation, the image controller portion 70 (FIG. 8) causes the light emitting portion 50 to selectively emit light as described below based on positional shift information of the light emitting element array chip 40 stored in the head information storage portion 171, thereby suppressing the formation of the image streak.

Figure 4A:
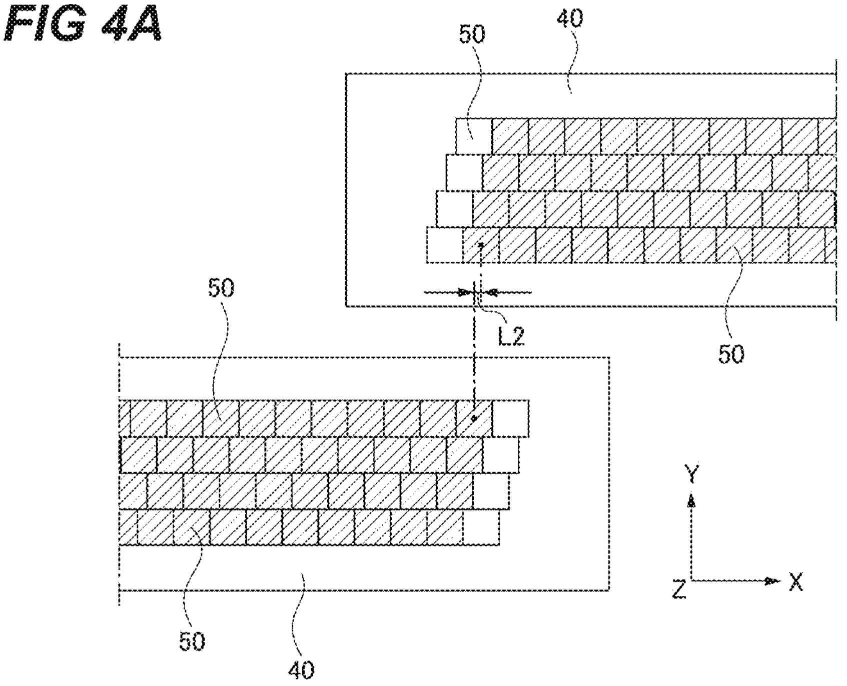
FIGS. 4A and 4B are views illustrating a positional relationship between two light emitting element array chips and light emitting portions to be used.
Figure 4B:
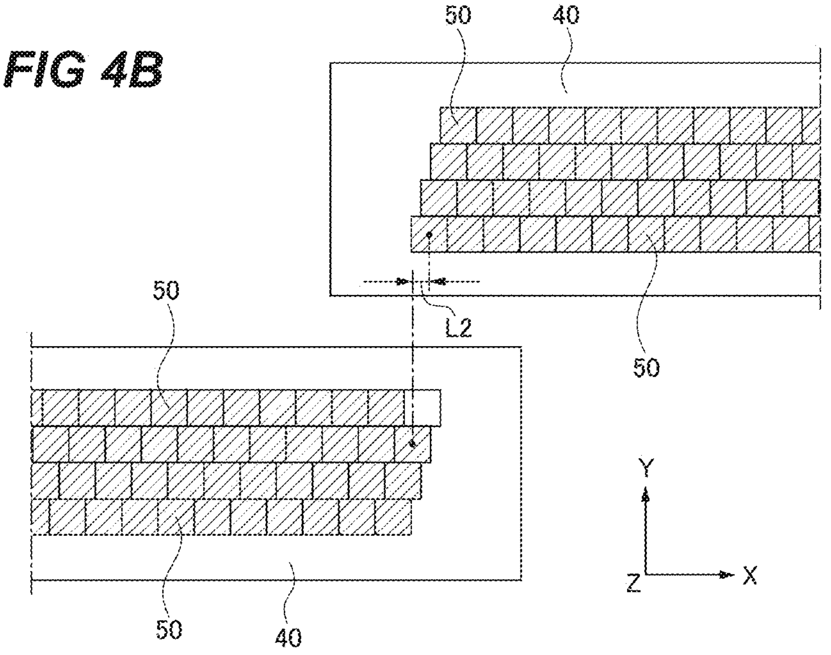

FIG. 4 is a view illustrating two light emitting element array chips 40 adjacent to each other in the arrow Y direction. In FIG. 4, the light emitting portion 50 that is hatched indicates the light emitting portion 50 used at the time of exposure, and a light emitting portion 50 that is not hatched indicates the light emitting portion 50 that is not used at the time of exposure. In addition, in FIGS. 4A and 4B, the relative positions of the two light emitting element array chips 40 adjacent to each other in the arrow Y direction, in the arrow X direction are different.

As illustrated in FIG. 4, the image controller portion 70 selects the light emitting portion 50 to be used at the time of exposure in such a way that a distance L2 between the light emitting portions 50 used at the time of exposure among the light emitting portions 50 of the two light emitting element array chips 40 adjacent in the arrow Y direction, in the arrow X direction is closest to an interval of 4800 dpi. In the present embodiment, as described below, since the exposure head 6 is configured to perform exposure at a resolution of 4800 dpi in the arrow X direction, the distance L2 is close to an interval of 4800 dpi, but the distance L2 is set according to the resolution of the exposure performed by the exposure head 6 in the arrow X direction.

In the present embodiment, the arrow X direction which is the longitudinal direction of the light emitting element array chip 40 is a rotational axis direction of the photosensitive drum 1 and is also a main scanning direction. The arrow Y direction, which is the lateral direction of the light emitting element array chip 40, is a rotation direction of the photosensitive drum 1, and is also a sub-scanning direction. The rotation direction of the photosensitive drum 1 is a tangential direction of the photosensitive drum 1 at an exposure position on the photosensitive drum 1 where light is collected by the exposure head 6. In addition, an arrow Z direction is a stacking direction in which layers of the light emitting portion 50 having a layer structure described below overlap each other. Note that the longitudinal direction of the light emitting element array chip 40 may be inclined by about ±1° with respect to the rotational axis direction of the photosensitive drum 1. The lateral direction of the light emitting element array chip 40 may also be inclined by about ±1° with respect to the rotation direction of the photosensitive drum 1.

<Light Emitting Element Array Chip>

Next, a configuration of the light emitting element array chip 40 will be described.

Figure 5:
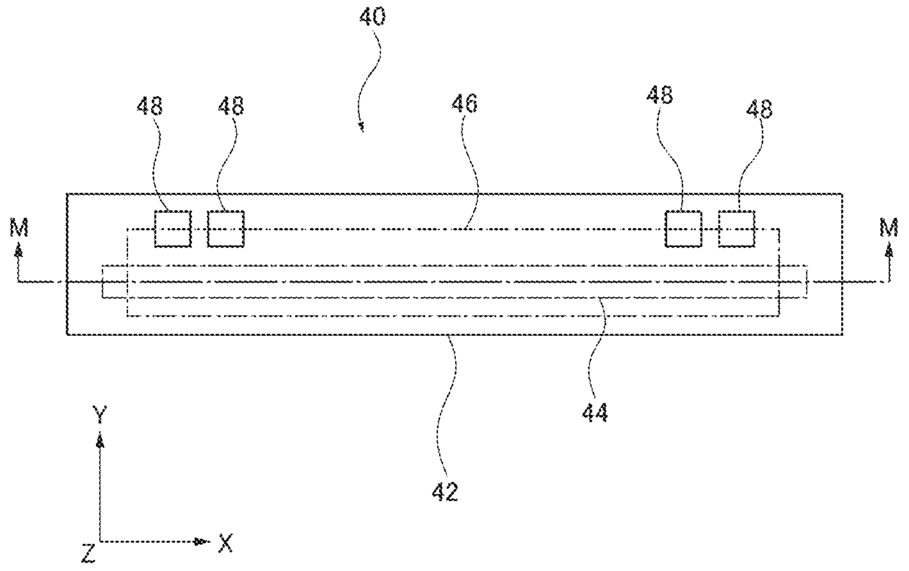
FIG. 5 is a schematic view of a light emitting element array chip.
Figure 6:
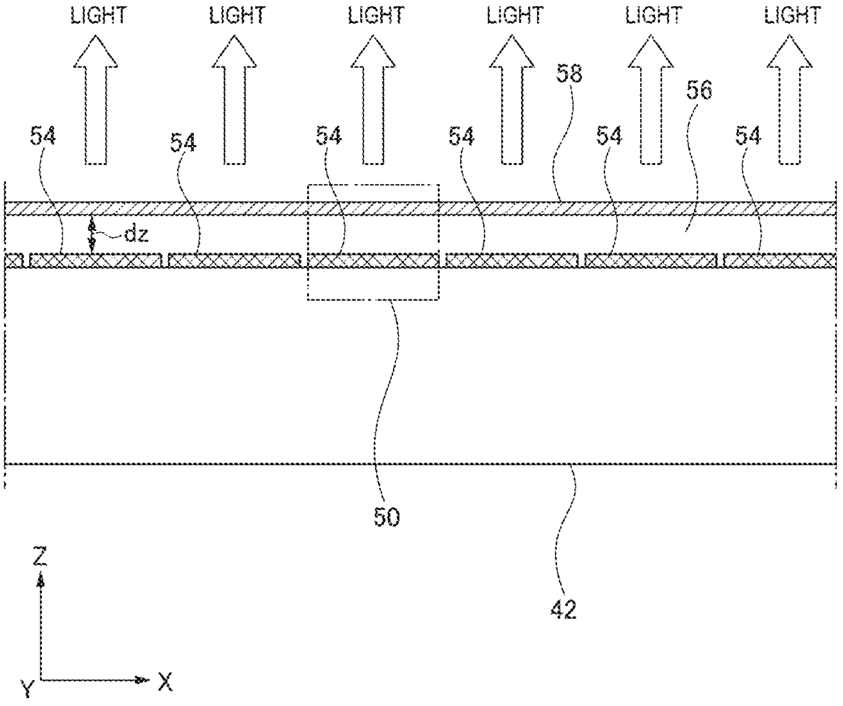
FIG. 6 is a cross-sectional view of the light emitting element array chip.
Figure 7:
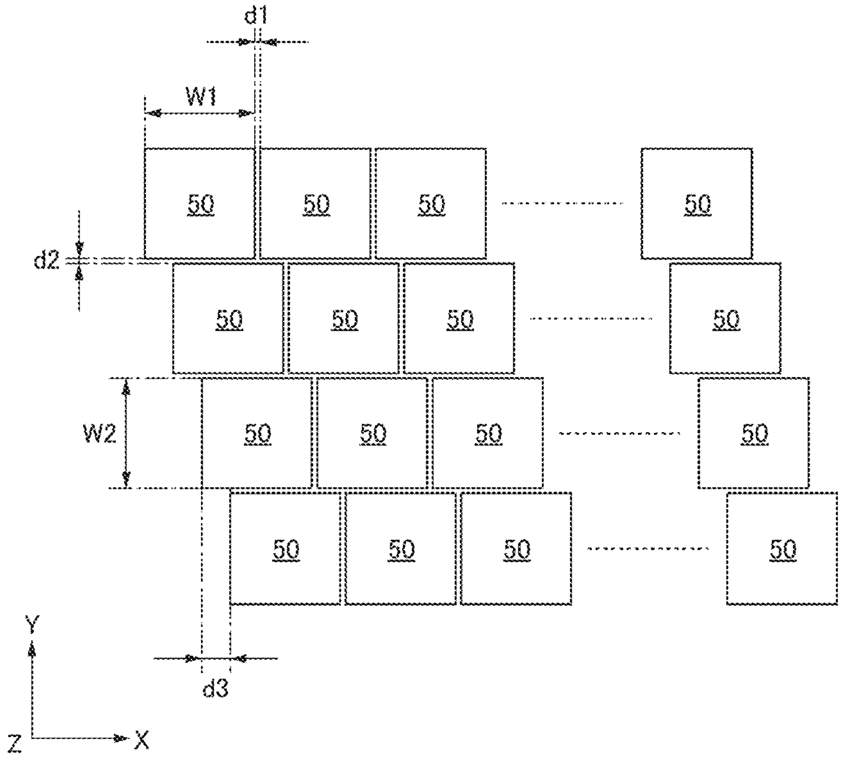
FIG. 7 is a schematic view for explaining arrangement of the light emitting portions.

FIG. 5 is a schematic view of the light emitting element array chip 40. FIG. 6 is a cross-sectional view of the light emitting element array chip 40 taken along line M-M of FIG. 5. FIG. 7 is a schematic view for explaining arrangement of the light emitting portions 50 of the light emitting element array chip 40.

As illustrated in FIG. 5, the light emitting element array chip 40 includes a light emitting substrate 42 (substrate) incorporating a circuit portion 46 for controlling the light emitting portions 50, a light emitting region 44 in which the plurality of light emitting portions 50 are regularly arranged on the light emitting substrate 42, and a wire bonding pad 48. Input and output of a signal between the outside of the light emitting element array chip 40 and the circuit portion 46 and power supply to the circuit portion 46 are performed through the wire bonding pad 48. Note that the circuit portion 46 can use an analog drive circuit, a digital control circuit, or a circuit including both of them.

As illustrated in FIG. 6, the light emitting portion 50 includes the light emitting substrate 42, a plurality of lower electrodes 54 two-dimensionally arranged at regular intervals (intervals d1 and d2 illustrated in FIG. 7) in the arrow X direction and the arrow Y direction on the light emitting substrate 42, a light emitting layer 56, and an upper electrode 58.

The lower electrodes 54 (a first electrode layer including a plurality of electrodes) are a plurality of electrodes formed in a layer form at intervals on the light emitting substrate 42, and are electrodes provided corresponding to pixels, respectively. That is, each lower electrode 54 is provided to form one pixel.

The upper electrode 58 (second electrode layer) is stacked on the light emitting layer 56 at a position on a side opposite to a side where the lower electrode 54 is arranged with respect to the light emitting layer 56. The upper electrode 58 is an electrode through which light having a light emission wavelength of the light emitting layer 56 can be transmitted (transmissible).

The circuit portion 46 controls a potential of a selected lower electrode 54 based on the control signal generated according to the image data, and generates a potential difference between the selected lower electrode 54 and the upper electrode 58. When the potential difference is generated between the upper electrode 58 as a positive electrode and the lower electrode 54 as a negative electrode, electrons flow into the light emitting layer 56 from the negative electrode, and holes flow into the light emitting layer 56 from the positive electrode. The light emitting layer 56 emits light by recombination of the electrons and the holes in the light emitting layer 56.

Light directed to the upper electrode 58 by light emission of the light emitting layer 56 is transmitted through the upper electrode 58 and emitted. Further, the light directed from the light emitting layer 56 toward the lower electrode 54 is reflected from the lower electrode 54 toward the upper electrode 58, and the reflected light is also transmitted through the upper electrode 58 and emitted. In this manner, the light emitting portion 50 emits light. Note that, although there is a time difference between an emission timing of the light emitted directly from the light emitting layer 56 toward the upper electrode 58 and an emission timing of the light reflected by the lower electrode 54 and emitted from the upper electrode 58, since a layer thickness of the light emitting portion 50 is extremely small, the emission timings can be regarded as almost the same.

Note that, in the present embodiment, the light emitting substrate 42 is a silicon substrate. The upper electrode 58 is preferably transparent to the light emission wavelength of the light emitting layer 56. For example, by using a transparent electrode formed of indium tin oxide (ITO), an opening ratio becomes substantially 100%, and light emitted from the light emitting layer 56 passes through the upper electrode 58 and is emitted as it is. In the present embodiment, the upper electrode 58 is a positive electrode provided in common for the respective lower electrodes 54, but the upper electrode 58 may also be provided individually for each of the lower electrodes 54, or one upper electrode 58 may be provided for a plurality of lower electrodes 54. In a case where a transparent electrode is used as the upper electrode 58, the whole electrode is not necessarily a transparent electrode, and only an opening through which light is emitted may be a transparent electrode, and a portion other than the opening may be an electrode other than the transparent electrode, such as a metal wire.

As the light emitting layer 56, an organic EL film, an inorganic EL layer, or the like is used. In a case where an organic EL film is used as the light emitting layer 56, the light emitting layer 56 may be a stacked structure including functional layers such as an electron transport layer, a hole transport layer, an electron injection layer, a hole injection layer, an electron blocking layer, and a hole blocking layer as necessary. Further, the light emitting layer 56 may be continuously formed in the arrow X direction, or may be divided in the same size as the lower electrode 54. In addition, each of the lower electrodes 54 may be divided into a plurality of groups, and one light emitting layer 56 may be stacked on the lower electrodes 54 belonging to each divided group.

Note that when a light emitting material vulnerable to moisture such as an organic EL layer or an inorganic EL layer is used as the light emitting layer 56, it is desirable to perform sealing in order to prevent moisture from entering the light emitting region 44. As a sealing method, for example, a single thin film of silicon oxide, silicon nitride, aluminum oxide, or the like or a sealing film in which the thin films are stacked is formed. As a method for forming the sealing film, a method excellent in covering performance for a structure such as a step is preferable, and for example, an atomic layer deposition method (ALD method) or the like can be used. Note that the material, configuration, forming method, and the like of the sealing film are merely examples, and are not limited to the examples described above, and it is sufficient if a suitable material, configuration, forming method, and the like are appropriately selected.

The lower electrode 54 is preferably formed of a metal having a high reflectance with respect to the light emission wavelength of the light emitting layer 56. For example, Ag, Al, or an alloy of Ag and Al is used. The lower electrode 54 is formed by using a Si integrated circuit processing technology together with the formation of the circuit portion 46, and is directly connected to a drive portion of the circuit portion 46. As described above, as the lower electrode 54 is formed by the Si integrated circuit processing technology, the process rule is about 0.2 μm, and high accuracy is obtained, so that the lower electrodes 54 can be accurately and densely arranged. Furthermore, since the lower electrodes 54 can be densely arranged, most of the light emitting region 44 can be caused to emit light, and utilization efficiency of the light emitting region 44 can be enhanced. An organic material of the light emitting layer 56 fills a space between the respective lower electrodes 54, and the respective lower electrodes 54 are partitioned by the organic material.

In addition, when a voltage applied across the light emitting portion 50 becomes a predetermined value or more, a current starts to flow, and thereafter, a value of the current increases substantially in proportion to the value of the voltage. The voltage at which the current starts to flow in each light emitting portion 50 varies. Therefore, before product shipment from the factory, the light emitting portions 50 of the light emitting element array chip 40 are caused to individually and sequentially emit light, and the current flowing through the light emitting portion 50 is adjusted in such a way that light collected through the rod lens array 23 has a predetermined light quantity. Note that the exposure head 6 performs not only the above-described light quantity adjustment but also focus adjustment for adjusting an interval between the light emitting element array chip 40 and the rod lens array 23 before product shipment from the factory.

As illustrated in FIG. 7, the light emitting portions 50 are arranged in a matrix form at predetermined intervals in the arrow X direction and the arrow Y direction in the light emitting region 44. In the present embodiment, a width W1 of the light emitting portion 50 in the arrow X direction is 19.80 μm, and the interval d1 between the light emitting portions 50 adjacent to each other in the arrow X direction is 0.68 μm. That is, the light emitting portions 50 are arranged at a pitch of 21.16 μm (1200 dpi) in the arrow X direction. Note that the pitch of the light emitting portions 50 in the arrow X direction may have a deviation within a tolerance range. The tolerance of the pitch of the light emitting portions 50 in the arrow X direction is ±1% with respect to a design nominal pitch of the light emitting portions 50 in the arrow X direction. That is, the tolerance of the pitch of the light emitting portions 50 in the arrow X direction according to the present embodiment is ±0.21 μm.

A width W2 of the light emitting portion 50 in the arrow Y direction is also 19.80 μm similarly to the width W1. That is, the light emitting portion 50 of the present embodiment has a square shape having one side of 19.80 μm. Note that, although the light emitting portion 50 has a square shape because the width W1 and the width W2 are equal to each other, the widths W1 and W2 may have deviations within a tolerance range. In the present embodiment, the tolerances of the widths W1 and W2 are both ±0.2 μm.

In addition, the interval d2 between the light emitting portions 50 adjacent to each other in the arrow Y direction is also 0.68 μm similarly to the interval d1, and the light emitting portions 50 are arranged at a pitch of 21.16 μm (1200 dpi) also in the arrow Y direction. Note that the pitch of the light emitting portions 50 in the arrow Y direction may have a deviation within a tolerance range. The tolerance of the pitch of the light emitting portions 50 in the arrow Y direction is ±1% with respect to a design nominal pitch of the light emitting portions 50 in the arrow Y direction. That is, the tolerance of the pitch of the light emitting portions 50 in the arrow Y direction according to the present embodiment is ±0.21 μm. Here, the intervals d1 and d2 between the light emitting portions 50 are set to be larger than an interval dz (FIG. 6) between the upper electrode 58 and the lower electrode 54. With such a configuration, a leakage current between the lower electrodes 54 adjacent to each other in the arrow X direction and the arrow Y direction can be suppressed, and erroneous light emission of the light emitting portion 50 can be suppressed.

Here, the width, shape, arrangement, and the like of the light emitting portion 50 are substantially determined by the width, shape, and arrangement of the lower electrode 54 in the present embodiment, and thus can also be referred to as the width, shape, and arrangement of the lower electrode 54. In addition, in the present embodiment, the distance between the light emitting portions 50, that is, the distance between the lower electrodes 54 means an inter-centroid distance defined based on design nominal centroid positions of the lower electrodes 54.

The light emitting portions 50 adjacent to each other in the arrow Y direction are arranged in such a way that the positions thereof are shifted by an interval d3 in the arrow X direction. In the present embodiment, the interval d3 is set to 5.29 μm (4800 dpi). In terms of all the light emitting portions 50, the four light emitting portions 50 arranged in parallel in the arrow Y direction are arranged in such a way as to be shifted from each other in the arrow X direction by an integer multiple of the interval d3. In other words, the four lower electrodes 54 provided in the arrow Y direction to form an identical pixel are arranged in such a way as to partially overlap each other when viewed from the arrow Y direction and in such a way that the inter-centroid distance between the lower electrodes 54 in the arrow X direction is equal.

Here, the interval d3 is determined as follows in the present embodiment. That is, a resolution of an image formed by the image forming apparatus A in the main scanning direction (arrow X direction) is m [dpi], the number of light emitting portions 50 arranged in parallel in the arrow Y direction is n, and a reference value of a shift amount of the positions of the light emitting portions 50 arranged in parallel in the arrow Y direction in the arrow X direction is the interval d3 [mm] (reference value). In this case, the interval d3 is obtained from $d3=25.4/m\times 1/n$, and the light emitting portions 50 arranged in parallel in the arrow Y direction are arranged in such a way as to be shifted in position from each other by an integer multiple of the interval d3. That is, in the present embodiment, since $m=1200$ and $n=4$, $d3=25.4/1200\times 1/4=0.00529$ [mm]=5.29 [μm].

In addition, even in a case where the interval d3 is determined as follows, the same result as the above calculation result of the interval d3 is obtained. That is, a pitch of the plurality of light emitting portions 50 having the same position in the arrow Y direction in the arrow X direction is q [mm], the number of light emitting portions 50 arranged in parallel in the arrow Y direction is n, and the reference value of the shift amount of the positions of the light emitting portions 50 arranged in parallel in the arrow Y direction in the arrow X direction is the interval d3 [mm] (reference value). In this case, the interval d3 is obtained from $d3=q/n$, and the light emitting portions 50 arranged in parallel in the arrow Y direction are arranged in such a way as to be shifted in position from each other by an integer multiple of the interval d3. That is, in the present embodiment, since $q=0.02116$ and $n=4$, $d3=0.02116/4=0.00529$ [mm]=5.29 [μm].

In addition, the interval d3 may be determined as follows instead of the above-described determination method. That is, in a case of the light emitting portions 50 arranged at different positions in the arrow Y direction to form an identical pixel, the number of light emitting portions 50 is n, and the width of the light emitting portion 50 in the arrow X direction is W1 [mm]. In this case, the interval d3 is obtained from $d3=W1/n$ (n is a natural number of 2 or more). The light emitting portions 50 arranged at different positions in the arrow Y direction to form an identical pixel are arranged in such a way that centroid positions of the light emitting portions 50 are positioned at the interval of d3 in the arrow X direction. That is, in order to form an identical pixel by multiple exposure described below, the light emitting portions 50 are arranged in such a way that the equal inter-centroid distance of the four light emitting portions 50 arranged at different positions in the arrow Y direction in the arrow X direction is d3. In the present embodiment, W1=19.80 [μm]=0.01980 [mm], and n=4. Therefore, d3=0.01980/4=0.00495 [mm]=4.95 [μm]. By setting the interval d3 in this manner, the overlapping amount of the four light emitting portions 50 arranged at different positions in the arrow Y direction to form an identical pixel, in the arrow X direction, is made uniform, so that the light quantity of each pixel is made uniform and the density of each pixel is made uniform in multiple exposure to be described below.

In the present invention, the shape of the light emitting portion 50 is not limited to a square, and may be a polygon with more sides than a quadrangle, a circle, an ellipse, or the like as long as light having an exposure region size corresponding to an output resolution of the image forming apparatus A is emitted and image quality of an output image satisfies a design specification of the image forming apparatus A. However, since a light quantity of an organic light emitting material is smaller than that of an LED, it is preferable to reduce a distance between adjacent light emitting portions 50 having a square shape because it is possible to secure a light emitting area for obtaining a light quantity enough to change the potential of the photosensitive drum 1. In addition, the number of light emitting portions 50 arranged in parallel in the arrow Y direction is not limited to four as long as two or more light emitting portions 50 are provided, and is determined based on the light quantity necessary for the exposure processing by the exposure head 6, the resolution of the image formed by the image forming apparatus A, or the like.

As described above, the distance between the light emitting portions 50, that is, the distance between the lower electrodes 54 is defined based on design nominal centroid positions of the lower electrodes 54. That is, in a case where the shape of the lower electrode 54 is a regular polygon, the distance between the lower electrodes 54 is set as the inter-centroid distance based on intersections of the diagonal lines, in a case where the shape of the lower electrode 54 is a perfect circle, the distance between the lower electrodes 54 is set based on the centers of the circles, and in a case where the shape of the lower electrode 54 is an ellipse, the distance between the lower electrodes 54 is set based on intersections of the major axes and the minor axes. In a case where the shape of the lower electrode 54 is a regular polygon, the corner does not have to be a perfect corner and may be rounded.

<System Configuration of Exposure Head>

Next, a configuration of the exposure head 6 and the image controller portion 70 (controller) that controls the exposure head 6 will be described. The image controller portion 70 is provided on a main body side of the image forming apparatus A. Although control performed when processing one piece of image data (single color) will be described below, similar processing is executed in parallel for four pieces of image data corresponding to yellow, magenta, cyan, and black when the image forming operation is performed.

Figure 8:
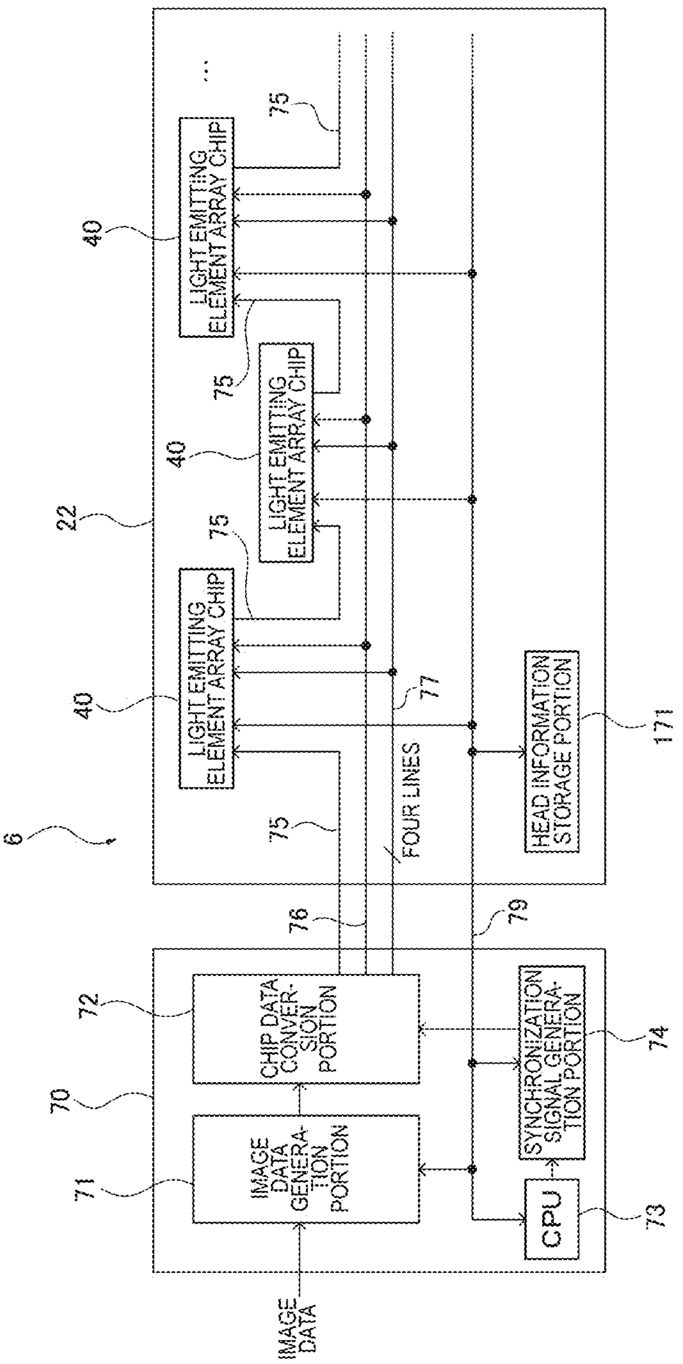
FIG. 8 is a block diagram illustrating a system configuration of an image controller portion and the exposure head.

FIG. 8 is a block diagram illustrating a system configuration of the image controller portion 70 and the exposure head 6. As illustrated in FIG. 8, the image controller portion 70 includes an image data generation portion 71, a chip data conversion portion 72, a CPU 73, and a synchronization signal generation portion 74. The image controller portion 70 executes image data processing and image forming timing processing by these parts, and transmits a control signal for controlling the exposure head 6 to the printed circuit board 22 of the exposure head 6.

Image data of an original read by the image reading portion 90 and image data transferred from an external device via a network are input to the image data generation portion 71 (image processing portion). The image data generation portion 71 executes dithering processing on the input image data at a resolution indicated by the CPU 73, and generates image data for outputting an image. In the present embodiment, the image data generation portion 71 executes the dithering processing at a resolution of 1200 dpi and with binary gradation, and then generates data of 4800 dpi in the main scanning direction and 2400 dpi in the sub-scanning direction with binary gradation by resolution enhancement processing. In the resolution enhancement processing, data of 1200 dpi is simply copied.

Figure 9A:
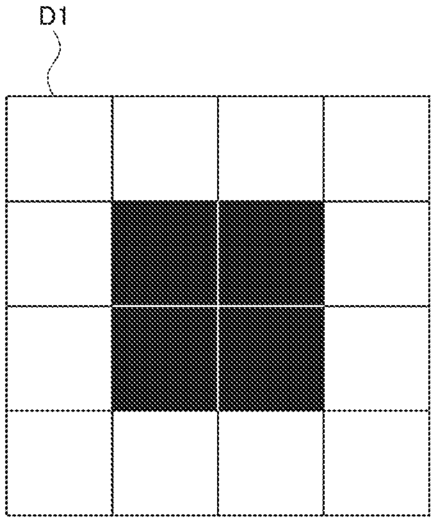
FIGS. 9A and 9B are views illustrating examples of image data before and after high-resolution processing.
Figure 9B:
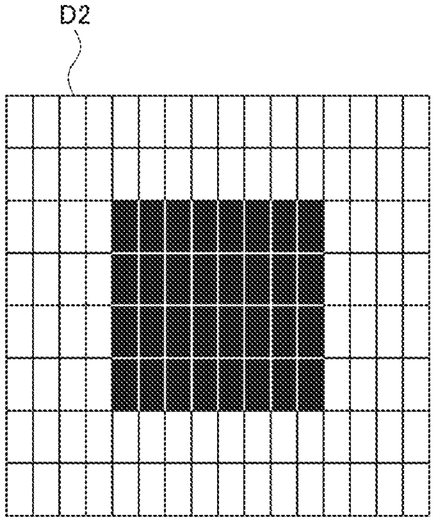

FIG. 9A is a view illustrating an example of image data D1 (first image data) before the high-resolution processing in the image data generation portion 71. FIG. 9B is a view illustrating image data D2 (second image data) obtained by executing the resolution enhancement processing on the image data D1 by the image data generation portion 71. As illustrated in FIG. 20, the image data D2 corresponding to the resolution of the exposure by the light emitting element array chip 40 is generated by the resolution enhancement processing. At this time, by generating binarized data, the image data generation portion 71 can enable high-definition image formation without losing sharpness of the image.

In the present embodiment, since the resolution of the dithering processing in the image data generation portion 71 is 1200 dpi, the image data after the dithering processing is generated in units of four light emitting portions 50 arranged in parallel in the arrow X direction on the photosensitive drum 1. Among rows of four light emitting portions 50 extending in the arrow X direction and arranged in parallel in the arrow Y direction, the light emitting portions 50 in the first row and the light emitting portions 50 in the second row are at different distances from the center of the rod lens array 23, and thus, there is a difference in light quantity of light with which the photosensitive drum 1 is irradiated between the respective rows. The same applies to the light emitting portions 50 in the third row and the fourth row. Therefore, by executing the dithering processing in units of four light emitting portions 50 arranged in parallel in the arrow X direction to generate the image data, it is possible to suppress the occurrence of moire and banding due to a density difference of generated dots. Further, by shifting the image data in such a way as to correct the image position of the image data after dithering at a resolution of 4800 dpi, it is possible to correct the image position at a high resolution of 4800 dpi while suppressing moire and banding.

The synchronization signal generation portion 74 periodically generates a line synchronization signal (control signal) indicating start of taking-in of image data, and transmits the line synchronization signal to the chip data conversion portion 72. The CPU 73 sets, as one line cycle, a cycle in which the surface of the photosensitive drum 1 moves by a pixel size in the rotation direction at a preset rotation speed of the photosensitive drum 1 according to the resolution of the image formed by the image forming apparatus A in the sub-scanning direction, and indicates, to the synchronization signal generation portion 74, a time interval of a signal cycle.

In the present embodiment, the resolution of the image formed by the image forming apparatus A in the sub-scanning direction is 2400 dpi, and the photosensitive drum 1 rotates at 200 mm/s. Therefore, a time for which the photosensitive drum 1 moves by a distance (10.58 um) of a pixel size of 2400 dpi is 52.92 us, and the cycle of the line synchronization signal is 52.92 us. Note that the rotation speed of the photosensitive drum 1 is calculated by the CPU 73 based on a set value stored in a storage portion (not illustrated).

The chip data conversion portion 72 divides image data of one line×four rows (the number of light emitting portions 50 in the arrow Y direction) into the respective light emitting element array chips 40 in synchronization with the line synchronization signal generated and input by the synchronization signal generation portion 74. Then, the chip data conversion portion 72 transmits the image data together with a clock signal and the line synchronization signal to each light emitting element array chip 40 via a line synchronization signal line 75, a clock signal line 76, and an image data signal line 77. Note that the number of image data signal lines 77 is four, which is the same as the number of light emitting portions 50 in the arrow Y direction.

Ahead information storage portion 171 included in the exposure head 6 is connected to the CPU 73 via a communication signal line 79. The head information storage portion 171 stores a light emission quantity and mounting position information of each light emitting element array chip 40 as head information. The light emitting element array chip 40 causes the light emitting portion 50 to emit light based on a set value of each of the above-described signals input from the image controller portion 70. In addition, the light emitting element array chip 40 generates a line synchronization signal to be used in another light emitting element array chip 40 connected via the line synchronization signal line 75.

<System Configuration of Light Emitting Element Array Chip>

Next, a system configuration of the light emitting element array chip 40 will be described.

Figure 10:
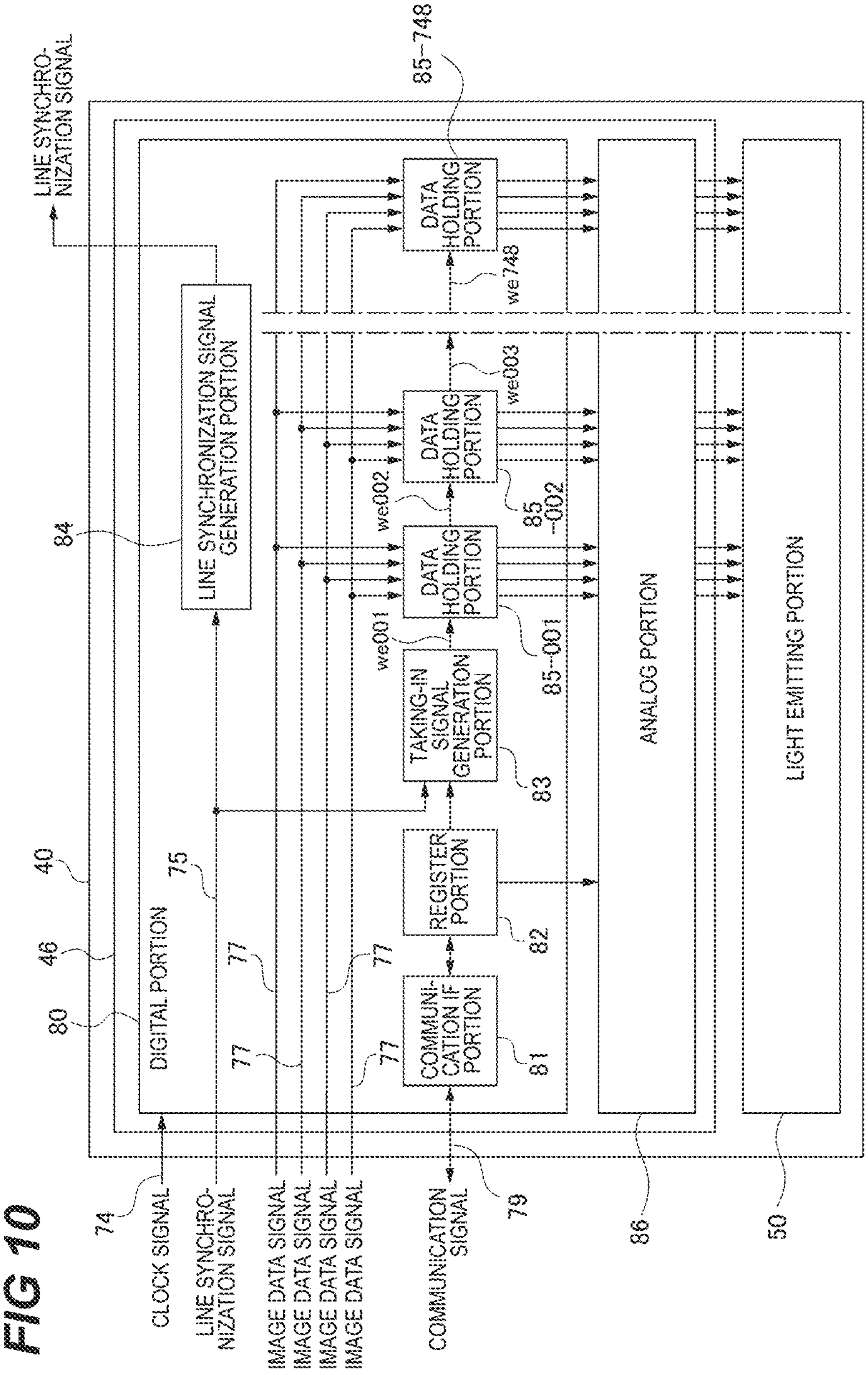
FIG. 10 is a block diagram illustrating a system configuration of the light emitting element array chip.

FIG. 10 is a block diagram illustrating a system configuration of the light emitting element array chip 40. In FIG. 10, since the clock signal is input to all blocks of a digital portion 80, the connection is omitted. As illustrated in FIG. 10, the circuit portion 46 of the light emitting element array chip 40 includes the digital portion 80 and an analog portion 86.

The digital portion 80 includes a communication IF portion 81, a register portion 82, a taking-in signal generation portion 83, a line synchronization signal generation portion 84, and a data holding portion 85. The digital portion 80 generates a pulse signal for causing the light emitting portion 50 to emit light based on the set value set in advance by a communication signal in synchronization with the clock signal, an image data signal, and the line synchronization signal by these parts, and transmits the pulse signal to the analog portion 86. Note that 748 light emitting portions 50 are provided as the data holding portions 85, 748 (85-001 to 85-748) being the number of light emitting portions 50 included in one light emitting element array chip 40 in the arrow X direction.

The line synchronization signal generation portion 84 delays the input line synchronization signal by a predetermined time, and generates a line synchronization signal to be used in another light emitting element array chip 40 connected via the line synchronization signal line 75. The taking-in signal generation portion 83 outputs a data latch signal we001 to the data holding portion 85-001 at a timing delayed from the input line synchronization signal by a predetermined set time input from the register portion 82.

The register portion 82 stores information regarding the delay time of the taking-in signal generation portion 83 described above, setting information of a drive current set by the analog portion 86, and the like. The communication IF portion 81 controls writing and reading of the set value to and from the register portion 82 based on the communication signal input from the CPU 73.

<Data Holding Portion>

Next, a configuration of the data holding portion 85 will be described.

Figure 11:
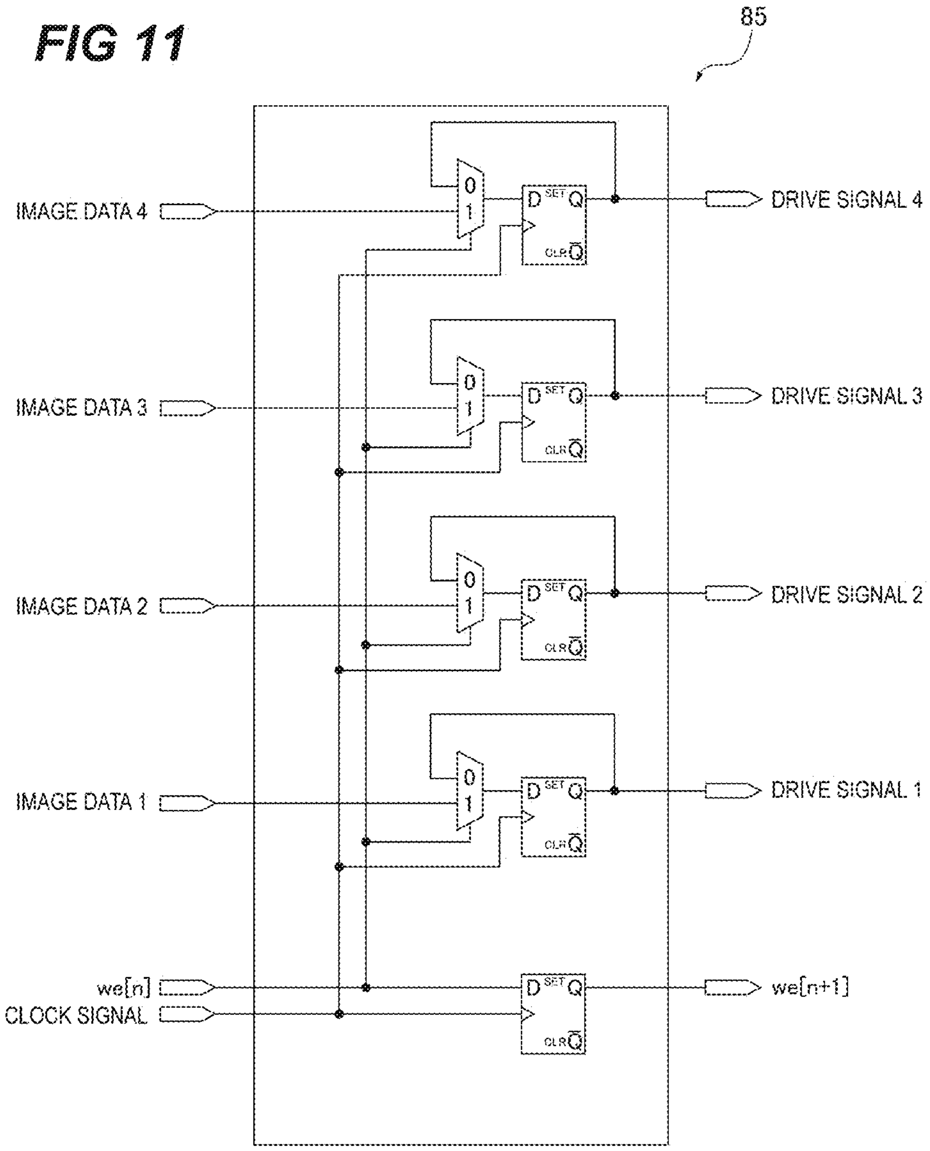
FIG. 11 is a circuit diagram of a data holding portion.

FIG. 11 is a circuit diagram of the data holding portion 85. As illustrated in FIG. 11, pieces of image data (image data 1 to 4) for four lines, a clock signal, and a data latch signal wen (n=1 to 748) are input to the data holding portion 85. Each data holding portion 85 includes four flip-flop circuits and four gate circuits for latching the pieces of image data for four lines simultaneously input at a timing when the data latch signal is input. Each data holding portion 85 includes one flip-flop circuit for delaying by one clock and outputting the data latch signal.

Figure 12:
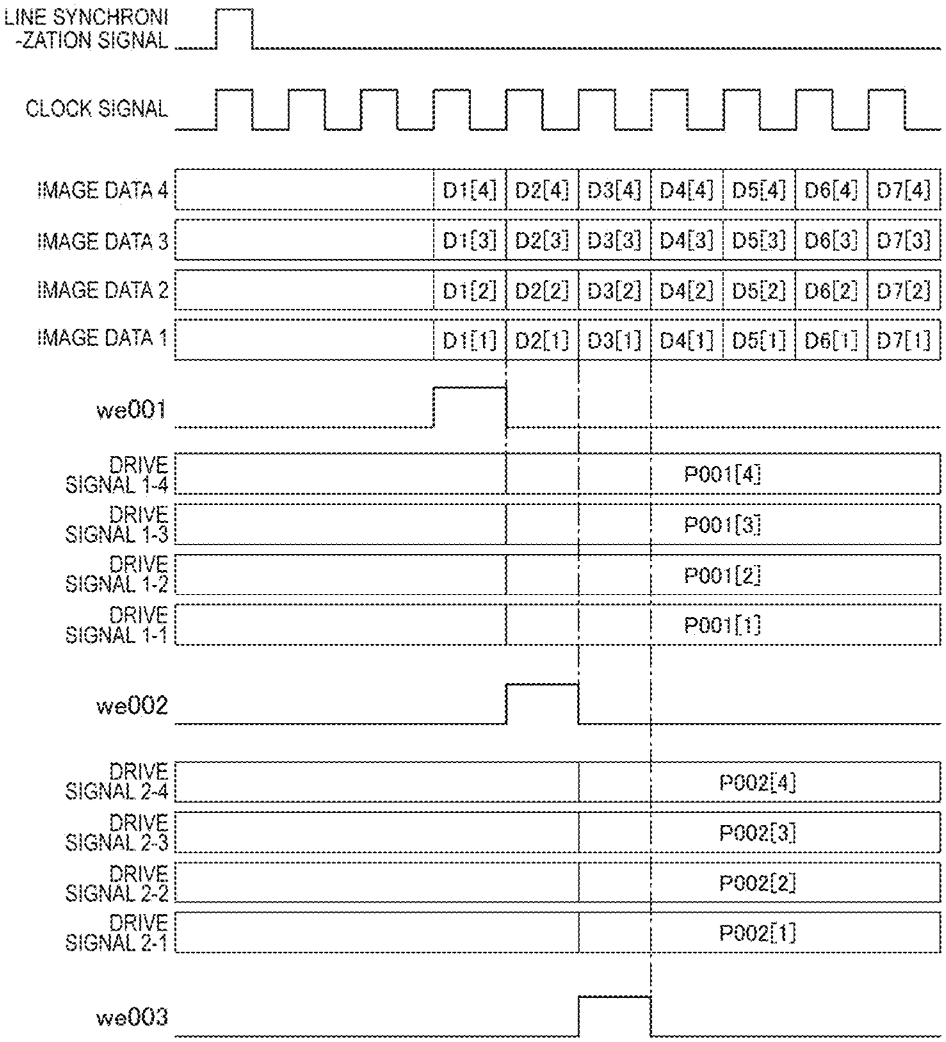
FIG. 12 is an operation timing chart of the data holding portion.

FIG. 12 is an operation timing chart of the data holding portion 85. As illustrated in FIG. 12, pieces of image data (D1[1] to D1[4]) for four lines are simultaneously input to the data holding portion 85-001. The data holding portion 85-001 latches the pieces of image data at a timing when a data latch signal we001 is input from the taking-in signal generation portion 83, and generates drive signals (P001[1] to P001[4]). In addition, the data holding portion 85-001 delays the input data latch signal we001 by one clock and transmits the delayed data latch signal to the next data holding portion 85-002 as a data latch signal we002.

Pieces of image data (D2[1] to D2[4]) for four lines are simultaneously input to the data holding portion 85-002. The data holding portion 85-002 latches the pieces of image data at a timing when the data latch signal we002 is input from the data holding portion 85-001, and generates drive signals (P002[1] to P002[4]). In addition, the data holding portion 85-002 delays the data latch signal we002 by one clock and transmits the delayed data latch signal to the data holding portion 85-003 as a data latch signal we003.

In this manner, the data holding portion 85 (−001 to 748) sequentially latches the pieces of image data while transmitting the data latch signal up to the 748-th data holding portion 85. Then, once the image data is latched, the data holding portion 85 (−001 to 748) transmits the latched signal to the analog portion 86 as the drive signal. In the present embodiment, since pieces of image data for four lines are latched by one data latch signal, drive signals for four lines (four pixels) are simultaneously output.

<Analog Portion>

Next, a configuration of the analog portion 86 will be described. The analog portion 86 includes a drive circuit connected to each of the light emitting portions 50 on a one-to-one basis. Hereinafter, for convenience of description, one drive circuit will be described, but it is assumed that the same number of drive circuits as the number of light emitting portions 50, that is, 2992 drive circuits (748×4 rows) exist.

Figure 13:
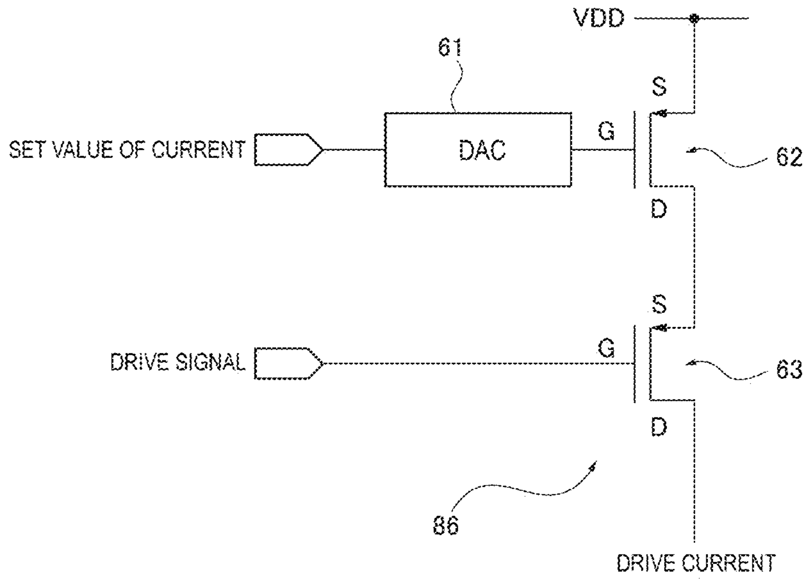
FIG. 13 is a circuit diagram of an analog portion.

FIG. 13 is a circuit diagram of the analog portion 86. As illustrated in FIG. 13, the analog portion 86 includes a current setting DAC 61, a current control MOSFET 62, and a switching MOSFET 63. The DAC 61 receives a set value of a current flowing from the register portion 82 of the digital portion 80 to the light emitting portion 50 as a digital value, converts the set value of the current into an analog voltage, and outputs the analog voltage.

The current control MOSFET 62 is a Pch MOSFET, has a source terminal connected to a power supply voltage VDD, and has a gate terminal connected to an output of the DAC 61. Further, a current flowing from the source to a drain increases as the analog voltage input from the DAC 61 increases.

The switching MOSFET 63 is a Pch MOSFET, has a source terminal connected to a drain terminal of the current control MOSFET 62, and has a gate terminal to which the drive signal output from the data holding portion 85 is input. The drive signal is a binary signal indicating a high level and a low level, and when the high level is input, the MOSFET 63 is turned on, and a current controlled by the current control MOSFET 62 flows from the source to the drain. Since the drain terminal is connected to an anode terminal of the light emitting portion 50, the current becomes a drive current for the light emitting portion 50.

<Lighting Control of Light Emitting Portion at Time of Image Formation>

Next, lighting control of the light emitting portion 50 at the time of image formation will be described. In the following description, the light emission of the light emitting portion 50 means that the light emitting portion 50 emits light of a light quantity enough to change a charging potential of the photosensitive drum 1 to the extent of being developed by toner. That is, the light emission of the light emitting portion 50 does not include a case where the light emitting portion 50 emits light of a light quantity enough to change the charging potential of the photosensitive drum 1 to such an extent that a toner image is not developed as a visible image.

Figure 14:
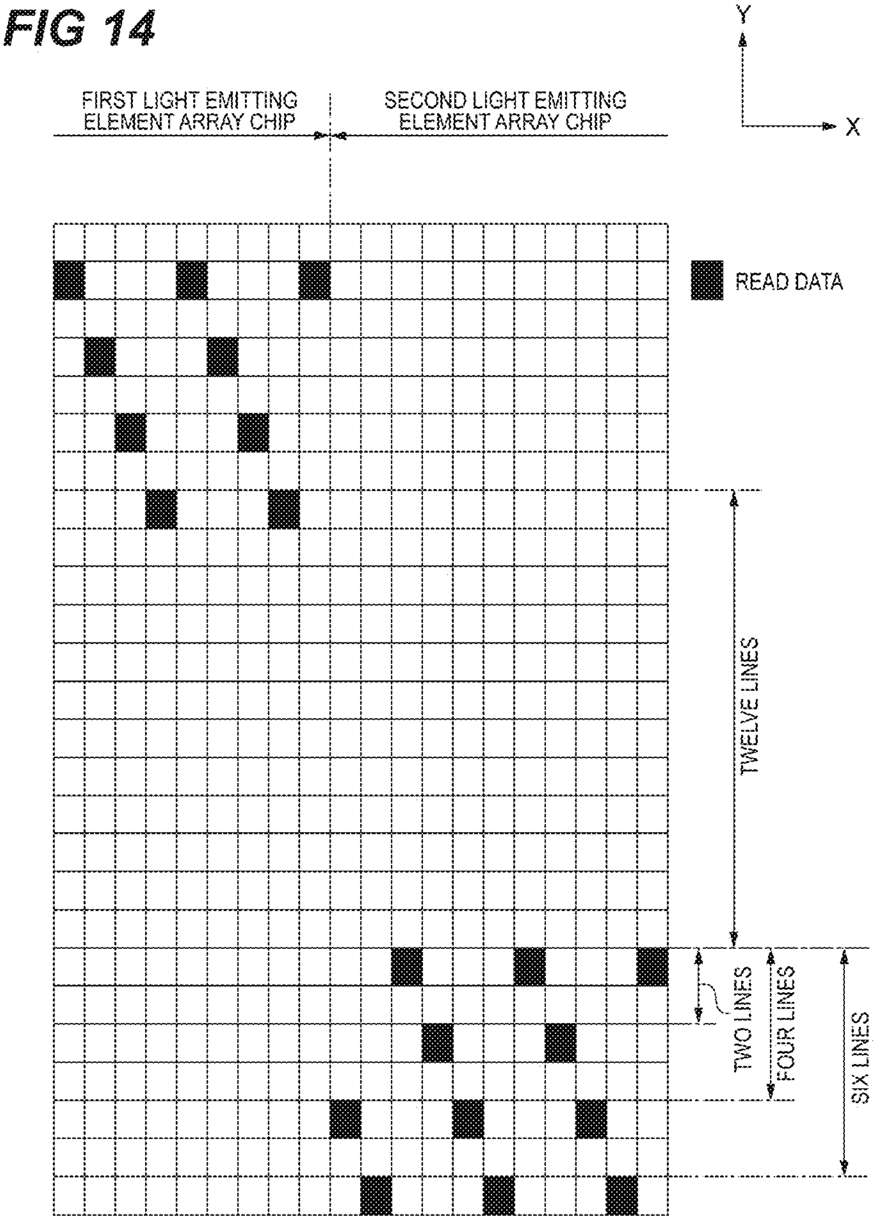
FIG. 14 is a view illustrating image data transmitted to the light emitting portion of the light emitting element array chip.

FIG. 14 is a view illustrating image data transmitted to the light emitting portion 50 of the light emitting element array chip 40 when forming one line image extending in the main scanning direction (arrow X direction). As illustrated in FIG. 14, when forming the above-described line image, first, a light emitting portion 50 positioned most upstream among four light emitting portions 50 arranged in parallel in the rotation direction (arrow Y direction) of the photosensitive drum 1 is caused to emit light. Next, at a timing delayed by two lines of 2400 dpi, a light emitting portion 50 immediately downstream of the light emitting portion 50 that has been initially caused to emit light is caused to emit light. In the delay operation, a reading position of the image data is set in such a way as to read the image data of a corresponding position with respect to a common line synchronization signal. As a result, the exposure position (irradiation position) in the sub-scanning direction on the photosensitive drum 1 for light emitted from the light emitting portion 50 positioned most upstream in the rotation direction of the photosensitive drum 1 and the exposure position in the sub-scanning direction on the photosensitive drum 1 for light emitted from the light emitting portion 50 immediately downstream of the light emitting portion 50 can be aligned.

Next, a light emitting portion 50 positioned three light emission portions downstream from the light emitting portion 50 positioned most upstream in the rotation direction of the photosensitive drum 1 is caused to emit light at a timing delayed by four lines of 2400 dpi from a light emission timing of the light emitting portion 50 positioned most upstream in the rotation direction of the photosensitive drum 1. Similarly, a light emitting portion 50 positioned four light emission portions downstream from the light emitting portion 50 positioned most upstream in the rotation direction of the photosensitive drum 1 is caused to emit light at a timing delayed by six lines of 2400 dpi from a light emission timing of the light emitting portion 50 positioned most upstream in the rotation direction of the photosensitive drum 1. As a result, it is possible to align all the exposure positions in the sub-scanning direction on the photosensitive drum 1 for the lights emitted from the four light emitting portions 50 arranged in parallel in the rotation direction of the photosensitive drum 1.

Figure 15:
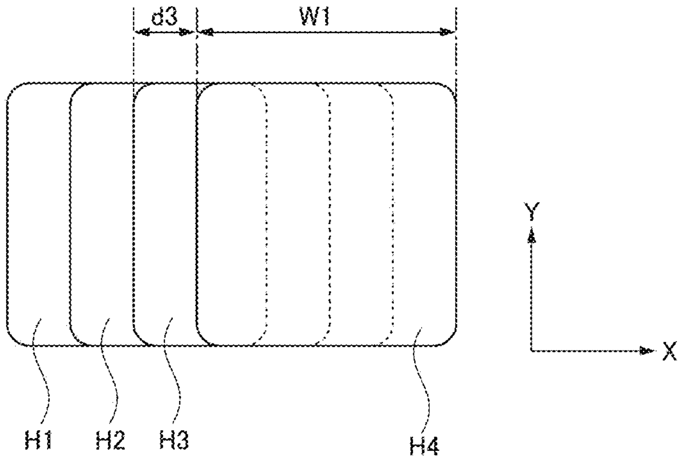
FIG. 15 is a schematic view illustrating a position of light on the photosensitive drum at the time of light emission of the light emitting portion.

FIG. 15 is a schematic view illustrating light irradiation positions on the photosensitive drum 1 when four light emitting portions 50 arranged in parallel in the arrow Y direction are caused to emit light by the above control. As illustrated in FIG. 15, in a case where the four light emitting portions 50 arranged in parallel in the Y direction are caused to emit light at the above-described timings, the photosensitive drum 1 is irradiated with lights H1 to H4 emitted from the four light emitting portions 50 at the same position in the arrow Y direction and at positions shifted by the interval d3 in the arrow X direction. Here, since the interval d3 is set to $d3=25.4/m\times1/n$, a portion where at least two of the lights H1 to H4 overlap is formed on the photosensitive drum 1, thereby forming one pixel. Therefore, it is possible to compensate for the light quantity when multiple exposure is performed on the photosensitive drum 1 to form an electrostatic latent image.

In the present embodiment, the light emitting portions 50 arranged in parallel in the arrow Y direction are shifted from each other by 5.29 μm (=d3) corresponding to 4800 dpi along the arrow X. Therefore, the exposure processing can be executed at a resolution of 4800 dpi on the photosensitive drum 1 without setting data of an edge portion of the image as an intermediate value. Therefore, it is possible to correct the image position at a resolution higher than the pitch of the light emitting portions 50 in the main scanning direction while suppressing a decrease in sharpness of the image. Even in a case of the configuration in which the interval d3 is 4.95 [μm] obtained from $d3=W1/n$ (n is a natural number of 2 or more), it is possible to obtain an effect of executing the exposure processing at a resolution higher than the pitch of the light emitting portions 50 in the main scanning direction on the photosensitive drum 1. In this case, the image data generation portion 71 executes the resolution enhancement processing according to a numerical value of the interval d3 calculated from $d3=W1/n$ (n is a natural number of 2 or more).

In addition, in a case where the width W1 of the light emitting portion 50 in the arrow X direction is small, the overlapping amount of the lights H1 to H4 between the light emitting portions 50 arranged in parallel in the arrow Y direction becomes small, which may cause a failure in performing multiple exposure well or a gap is generated between the lights H1 to H4 to cause an image streak. Therefore, the width W1 is set to at least twice or more of the interval d3. As a result, light emitted not only from the light emitting portion 50 adjacent in the arrow Y direction but also from a light emitting portion 50 next to the light emitting portion 50 adjacent in the arrow Y direction can overlap on the photosensitive drum 1, multiple exposure can be performed with high accuracy, and formation of an image streak can be suppressed.

In addition, as described above, the interval L1 (shortest distance) between the light emitting portions 50 included in two light emitting element array chips 40 adjacent to each other in the arrow Y direction illustrated in FIG. 3(*c*) is set to ten lines of 2400 dpi. Therefore, regarding the rotation direction of the photosensitive drum 1, the light emission timing is delayed by 12 lines obtained by adding two lines, which correspond to a light emission area of the pixels, to the interval L1 between a light emitting portion 50 positioned most downstream in the first light emitting element array chip 40 and a light emitting portion 50 positioned most upstream in the second light emitting element array chip 40 positioned downstream of the first light emitting element array chip 40. With such a configuration, the exposure positions in the sub-scanning direction on the photosensitive drum 1 can be aligned between the light emitting portions 50 included in the light emitting element array chips 40 arranged in a staggered manner.

In the present embodiment, for all the light emitting portions 50 of the light emitting element array chip 40, the configuration in which the light emitting portions 50 arranged in parallel in the arrow Y direction are arranged in such a way as to be shifted in position in the arrow X direction by an integer multiple of the interval d3 has been described. However, the present invention is not limited thereto. That is, if the plurality of light emitting portions 50 included in the light emitting element array chip 40 include a light emitting portion group (electrode group) in which the light emitting portions 50 arranged in parallel in the arrow Y direction are arranged in such a way as to be shifted in position from each other in the arrow X direction by an integer multiple of the interval d3, the same effect as described above can be obtained.

Figure 16:
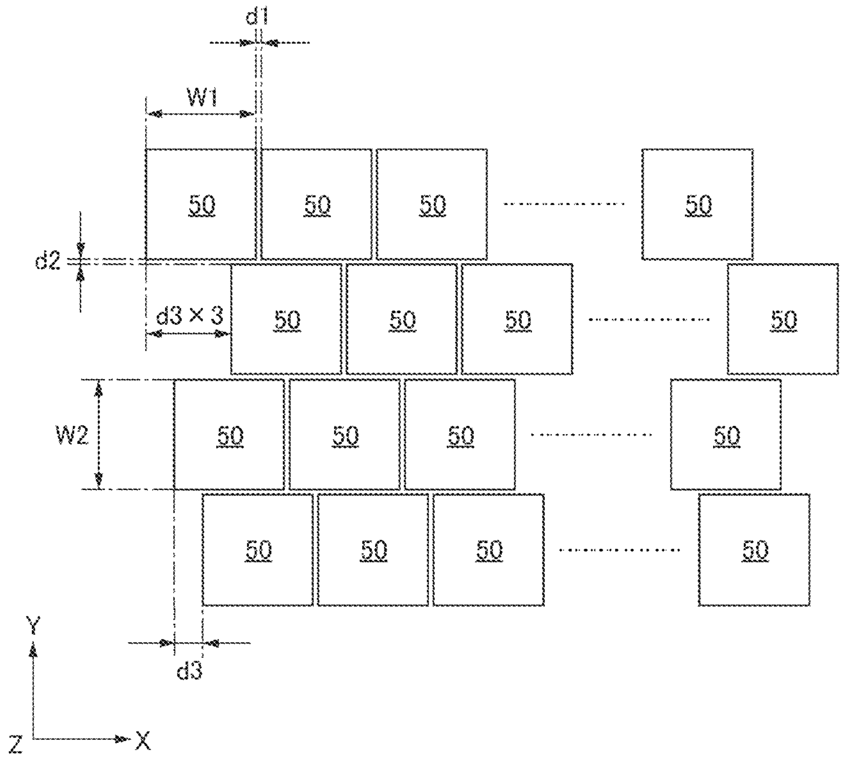
FIG. 16 is a schematic view for explaining arrangement of the light emitting portions.
Figure 17:
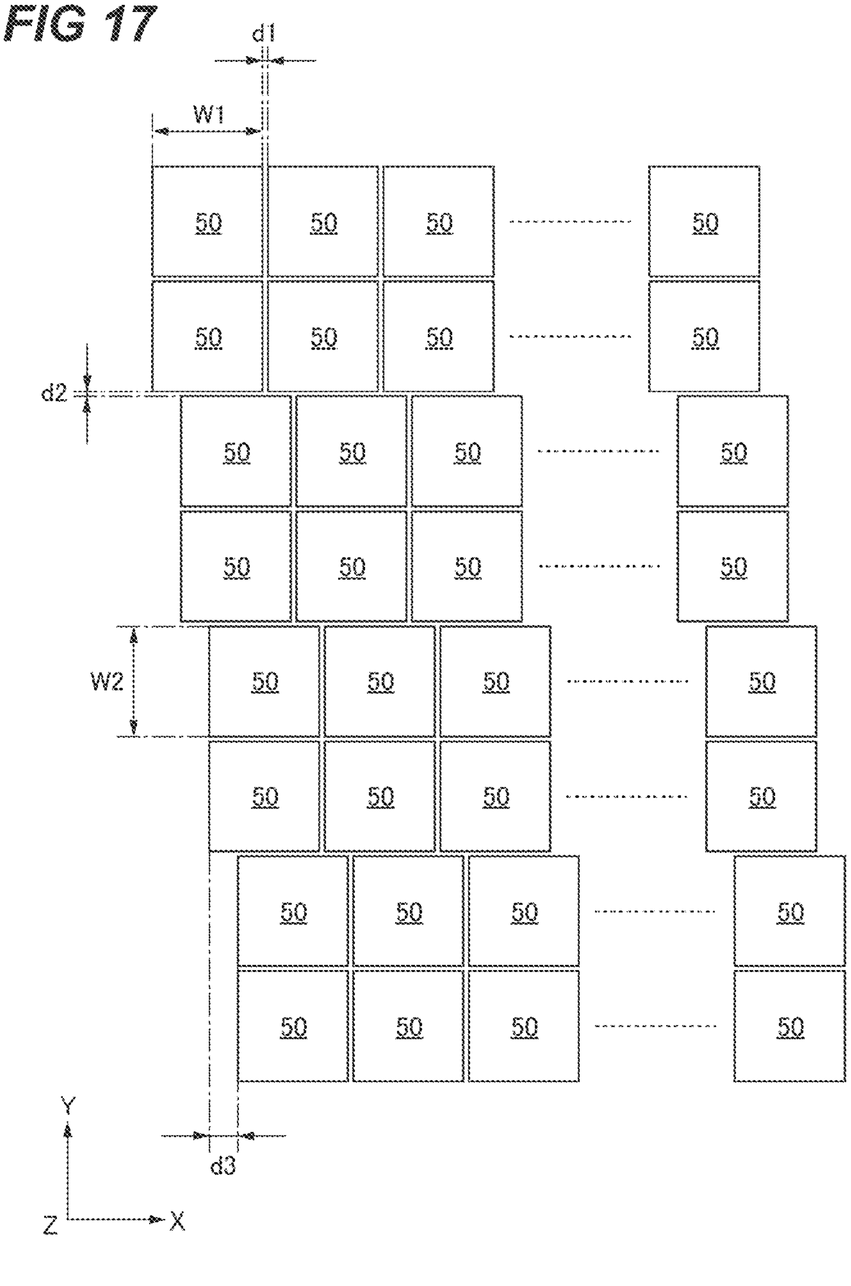
FIG. 17 is a schematic view for explaining arrangement of the light emitting portions.
Figure 18A:
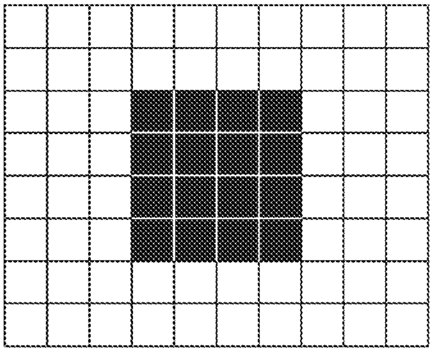
FIG 18A RELATED ART
FIGS. 18A and 18B are explanatory views for explaining a configuration according to the related art.
Figure 18B:
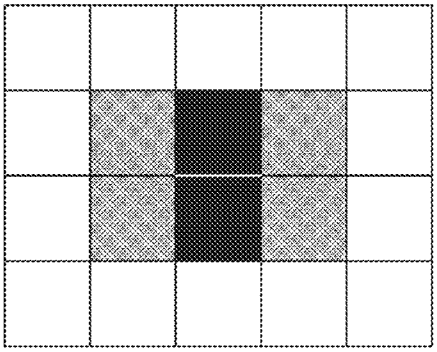
FIG 18B RELATED ART

Further, in the present embodiment, in the light emitting element array chip 40, the configuration in which the light emitting portions 50 adjacent to each other in the arrow Y direction are arranged in such a way as to be shifted in position by the interval d3 in the arrow X direction has been described, but the present invention is not limited thereto. That is, for example, as illustrated in FIG. 16, if the shift amount between the plurality of light emitting portions 50 arranged in parallel in the arrow Y direction in the arrow X direction is an integer multiple of the interval d3, the shift amount between the light emitting portions 50 adjacent in the arrow Y direction does not need to be the interval d3. As illustrated in FIG. 17, the plurality of light emitting portions 50 arranged in parallel in the arrow Y direction may partially include light emitting portions 50 at the same position in the arrow X direction. Also with the configuration illustrated in FIG. 16 or 17, exposure similar to the above can be performed by adjusting image data transmitted to the light emitting portion 50.

Although the present invention has been described with reference to the exemplary embodiments, the present invention is not limited to the disclosed exemplary embodiments. The following claims are given the broadest interpretation to encompass all modifications, equivalent structures and functions.

What is claimed is:

1. An image forming apparatus for forming an image on a recording material, comprising:

a photosensitive member configured to rotate;

an exposure head having a plurality of light emitting portions arranged along a rotational axis direction of the photosensitive member; and a controller configured to control the plurality of light emitting portions, wherein the plurality of light emitting portions include n light emitting portions arranged at different positions in a rotation direction of the photosensitive member, wherein the controller is configured to control the n light emitting portions such that one pixel is formed by the n light emitting portions; and wherein the plurality of light emitting portions are arranged so that d3=q/n (where n is a natural number greater than or equal to 2), where q is a pitch of the light emitting portions adjacent to each other in the rotational axis direction, and d3 is the interval at which the n light emitting portions for forming the one pixel are arranged in the rotational axis direction.

2. The image forming apparatus according to claim 1, wherein the exposure head further comprises a substrate having an elongated shape and a light emitting chip mounted on the substrate and having a silicon substrate, and the plurality of light emitting portions are formed on the silicon substrate.

3. The image forming apparatus according to claim 2, wherein the plurality of light emitting portions have a first electrode layer formed in a layered configuration and transmitting light, a second electrode layer formed in a layered configuration between the first electrode layer and the silicon substrate in a direction perpendicular to the surface of the silicon substrate and including a plurality of electrodes arranged in a two-dimensional configuration in the rotation direction and in the rotational axis direction, and a light-emitting layer formed between the first electrode layer and the second electrode layer in the direction perpendicular to the surface of the silicon substrate.

4. The image forming apparatus according to claim 3, wherein the image forming apparatus has a plurality of light emitting chips.

5. The image forming apparatus according to claim 4, wherein the plurality of the light emitting chips are disposed in a staggered arrangement along the rotational axis direction.

6. The image forming apparatus according to claim 1, wherein each of the n light emitting portions is not adjacent to one another in the rotational axis direction.

7. The image forming apparatus according to claim 1, wherein the controller controls lighting of the plurality of light emitting portions based on image data.

8. The image forming apparatus according to claim 7, wherein the image data is a set of binary bit data.

* * * * *